(12) United States Patent
Sekii

(10) Patent No.: US 12,482,130 B2
(45) Date of Patent: Nov. 25, 2025

(54) OBJECT DETECTION METHOD AND OBJECT DETECTION DEVICE

(71) Applicant: Konica Minolta, Inc., Tokyo (JP)

(72) Inventor: Taiki Sekii, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 543 days.

(21) Appl. No.: 17/783,266

(22) PCT Filed: Oct. 27, 2020

(86) PCT No.: PCT/JP2020/040222
§ 371 (c)(1),
(2) Date: Jun. 8, 2022

(87) PCT Pub. No.: WO2021/117363
PCT Pub. Date: Jun. 17, 2021

(65) Prior Publication Data
US 2023/0009925 A1 Jan. 12, 2023

(30) Foreign Application Priority Data
Dec. 9, 2019 (JP) ................. 2019-221988

(51) Int. Cl.
| | | |
|---|---|---|
| *G06T 7/73* | (2017.01) | |
| *G06T 7/11* | (2017.01) | |
| *G06V 10/25* | (2022.01) | |
| *G06V 10/764* | (2022.01) | |
| *G06V 10/82* | (2022.01) | |
| *G06V 10/98* | (2022.01) | |

(52) U.S. Cl.
CPC ................. *G06T 7/73* (2017.01); *G06T 7/11* (2017.01); *G06V 10/25* (2022.01); *G06V 10/764* (2022.01); *G06V 10/82* (2022.01); *G06V 10/98* (2022.01); *G06V 2201/07* (2022.01)

(58) Field of Classification Search
CPC .... G06T 7/73; G06T 7/11; G06T 9/00; G06V 10/25; G06V 10/764; G06V 10/82; G06V 10/98; G06V 2201/07; G06N 3/08; H04N 7/18
See application file for complete search history.

(56) References Cited

U.S. PATENT DOCUMENTS

| | | | |
|---|---|---|---|
| 10,528,812 B1* | 1/2020 | Brouard | G06V 20/176 |
| 10,593,043 B2* | 3/2020 | Lin | G06V 40/103 |

(Continued)

FOREIGN PATENT DOCUMENTS

| | | |
|---|---|---|
| JP | 2016-006626 A | 1/2016 |
| JP | 2019-046007 A | 3/2019 |
| JP | 2019-139497 A | 8/2019 |

OTHER PUBLICATIONS

International Search Report issued in corresponding International Application No. PCT/JP2020/040222 mailed Dec. 8, 2020, with translation (5 pages).

(Continued)

*Primary Examiner* — Aaron W Carter
(74) *Attorney, Agent, or Firm* — Osha Bergman Watanabe & Burton LLP

(57) ABSTRACT

A detection method of detecting a defined object from an image, includes estimating, on the image, an extreme point area including a boundary feature point that satisfies a criterion related to a boundary of the object.

14 Claims, 12 Drawing Sheets

(56) References Cited

U.S. PATENT DOCUMENTS

| | | | |
|---|---|---|---|
| 10,783,610 B2* | 9/2020 | Tafazoli Bilandi | G06T 1/60 |
| 11,461,597 B2* | 10/2022 | Hosono | G06V 10/44 |
| 2002/0118874 A1* | 8/2002 | Chung | G06T 7/62 |
| | | | 382/199 |
| 2006/0018539 A1* | 1/2006 | Sato | G06V 10/20 |
| | | | 382/173 |
| 2007/0253640 A1* | 11/2007 | Brett | G06T 7/194 |
| | | | 348/E5.051 |
| 2012/0093361 A1* | 4/2012 | Huang | G06T 7/277 |
| | | | 382/103 |
| 2013/0064432 A1* | 3/2013 | Banhazi | A01K 29/00 |
| | | | 382/110 |
| 2013/0129148 A1* | 5/2013 | Nanri | G06T 7/174 |
| | | | 382/103 |
| 2013/0216094 A1* | 8/2013 | DeLean | G06F 18/22 |
| | | | 382/103 |
| 2014/0226856 A1* | 8/2014 | Xie | G06V 30/155 |
| | | | 382/103 |
| 2016/0012278 A1* | 1/2016 | Banhazi | G06V 10/44 |
| | | | 382/110 |
| 2017/0132451 A1* | 5/2017 | Namiki | G06V 10/757 |
| 2018/0061070 A1* | 3/2018 | Higuchi | G06T 15/205 |
| 2018/0232887 A1* | 8/2018 | Lin | G06T 7/11 |
| 2018/0357518 A1* | 12/2018 | Sekii | G06V 40/103 |
| 2019/0236801 A1* | 8/2019 | Sekii | G06T 7/70 |
| 2019/0258878 A1* | 8/2019 | Koivisto | G06V 10/46 |
| 2019/0279371 A1* | 9/2019 | Usikov | G06T 7/11 |
| 2019/0392242 A1* | 12/2019 | Tariq | G06V 20/58 |
| 2019/0392268 A1* | 12/2019 | Tariq | G06V 20/56 |
| 2020/0066036 A1* | 2/2020 | Choi | G06T 17/10 |
| 2020/0250450 A1* | 8/2020 | Kim | G06V 10/255 |
| 2021/0192180 A1* | 6/2021 | Wang | G06V 20/698 |
| 2021/0224609 A1* | 7/2021 | Yang | G06N 3/045 |
| 2021/0304415 A1* | 9/2021 | Watanabe | G06T 7/11 |
| 2022/0207305 A1* | 6/2022 | Mosayyebpour Kaskari | |
| | | | G06F 18/256 |
| 2022/0327711 A1* | 10/2022 | Wang | G06T 7/143 |
| 2023/0009925 A1* | 1/2023 | Sekii | G06T 9/00 |
| 2023/0326167 A1* | 10/2023 | Mosayyebpour Kaskari | |
| | | | G06N 3/084 |
| 2024/0029394 A1* | 1/2024 | Sekii | G06T 7/75 |

OTHER PUBLICATIONS

Written Opinion issued in corresponding International Application No. PCT/JP2020/040222 mailed Dec. 8, 2020, with translation (6 pages).

Zhou et al. "Bottom-up Object Detection by Grouping Extreme and Center Points." Computer Vision and Pattern Recognition (CVPR), Apr. 25, 2019. (10 pages).

Redmon et al. "You Only Look Once: Unified, Real-Time Object Detection." Computer Vision and Pattern Recognition (CVPR), May 9, 2016. (10 pages).

* cited by examiner

FIG. 4

| Object area BB | First extreme point BB | Second extreme point BB | Third extreme point BB | Fourth extreme point BB | Class probability |
|---|---|---|---|---|---|
| Position relative to grid cell (X axis) | Position relative to grid cell (X axis) | Position relative to grid cell (X axis) | Position relative to grid cell (X axis) | Position relative to grid cell (X axis) | Class 1 probability |
| Position relative to grid cell (Y axis) | Position relative to grid cell (Y axis) | Position relative to grid cell (Y axis) | Position relative to grid cell (Y axis) | Position relative to grid cell (Y axis) | Class 2 probability |
| Size (X axis) | Size (X axis) | Size (X axis) | Size (X axis) | Size (X axis) | Class 3 probability |
| Size (Y axis) | Size (Y axis) | Size (Y axis) | Size (Y axis) | Size (Y axis) | ... |
| Confidence | Confidence | Confidence | Confidence | Confidence | |

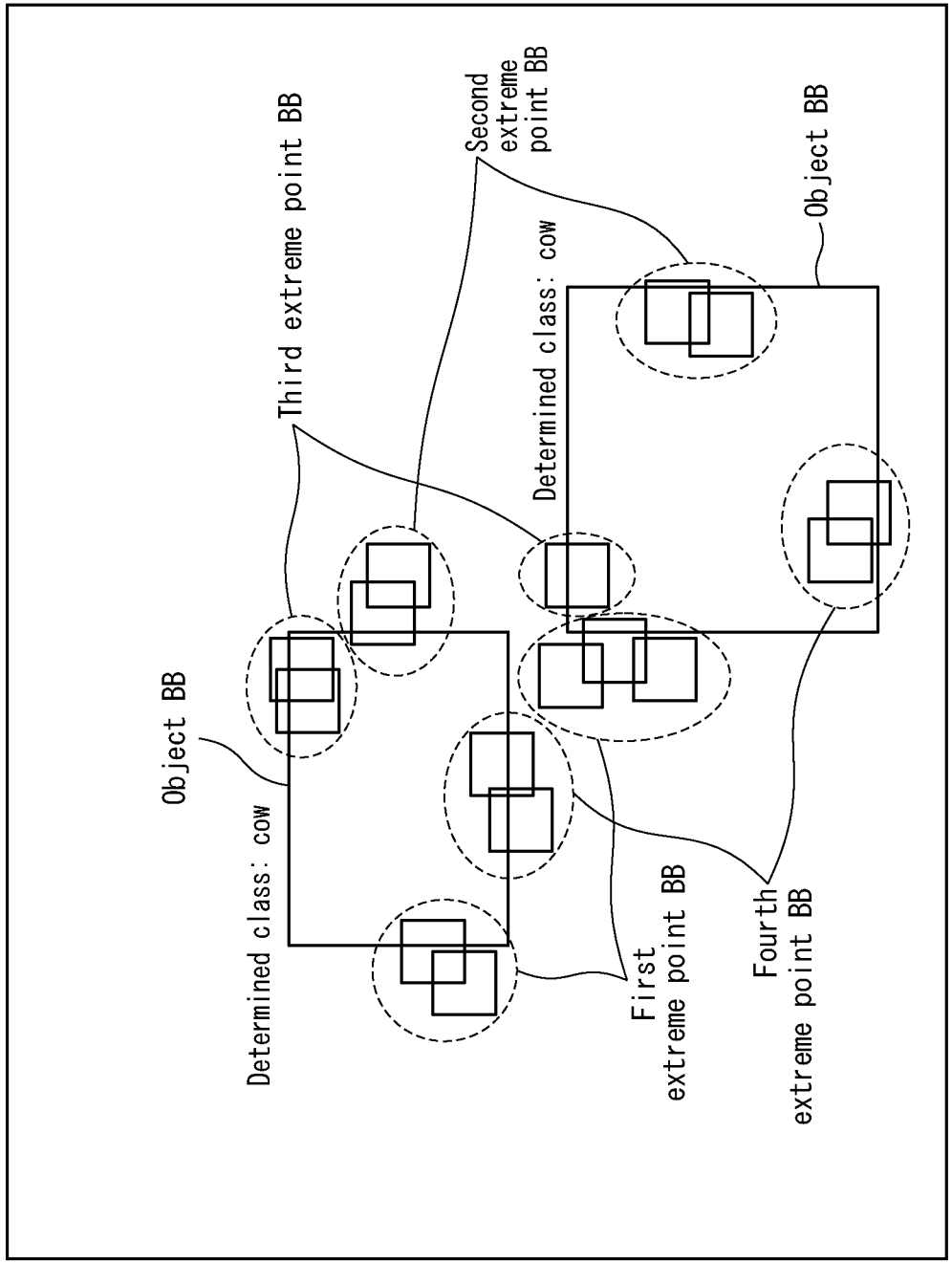

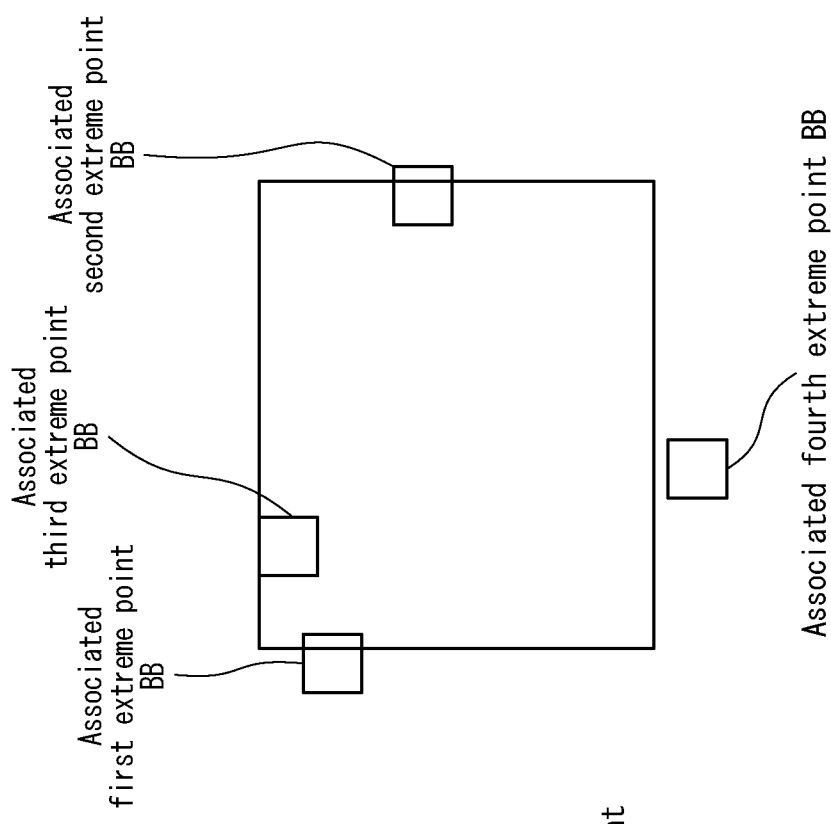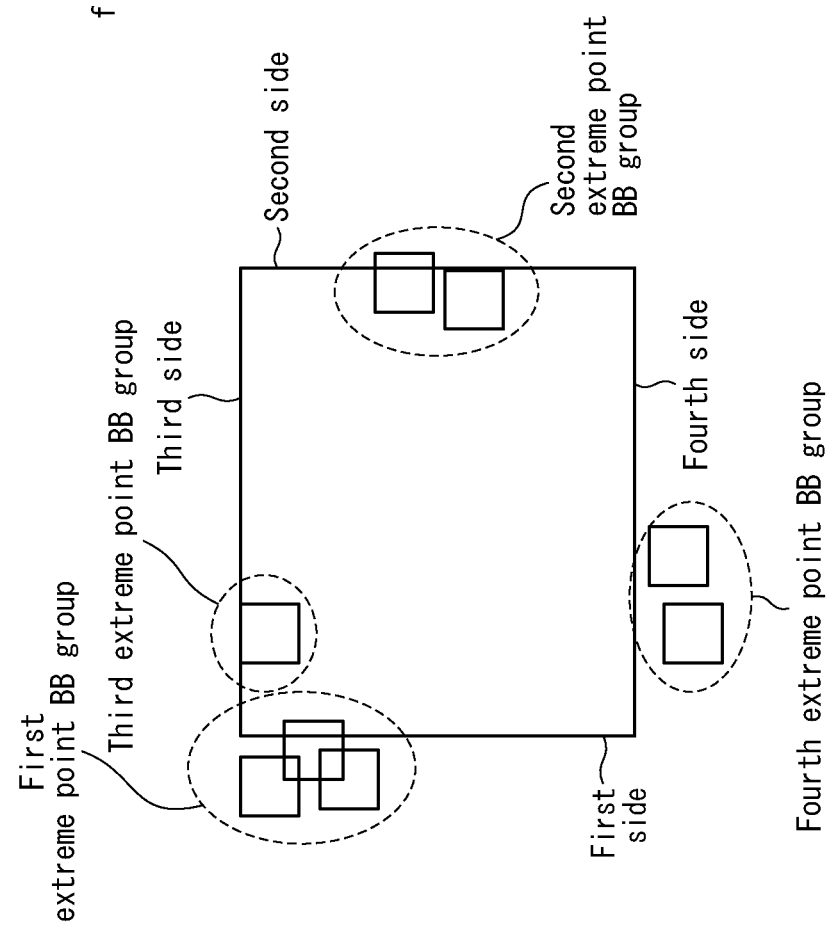

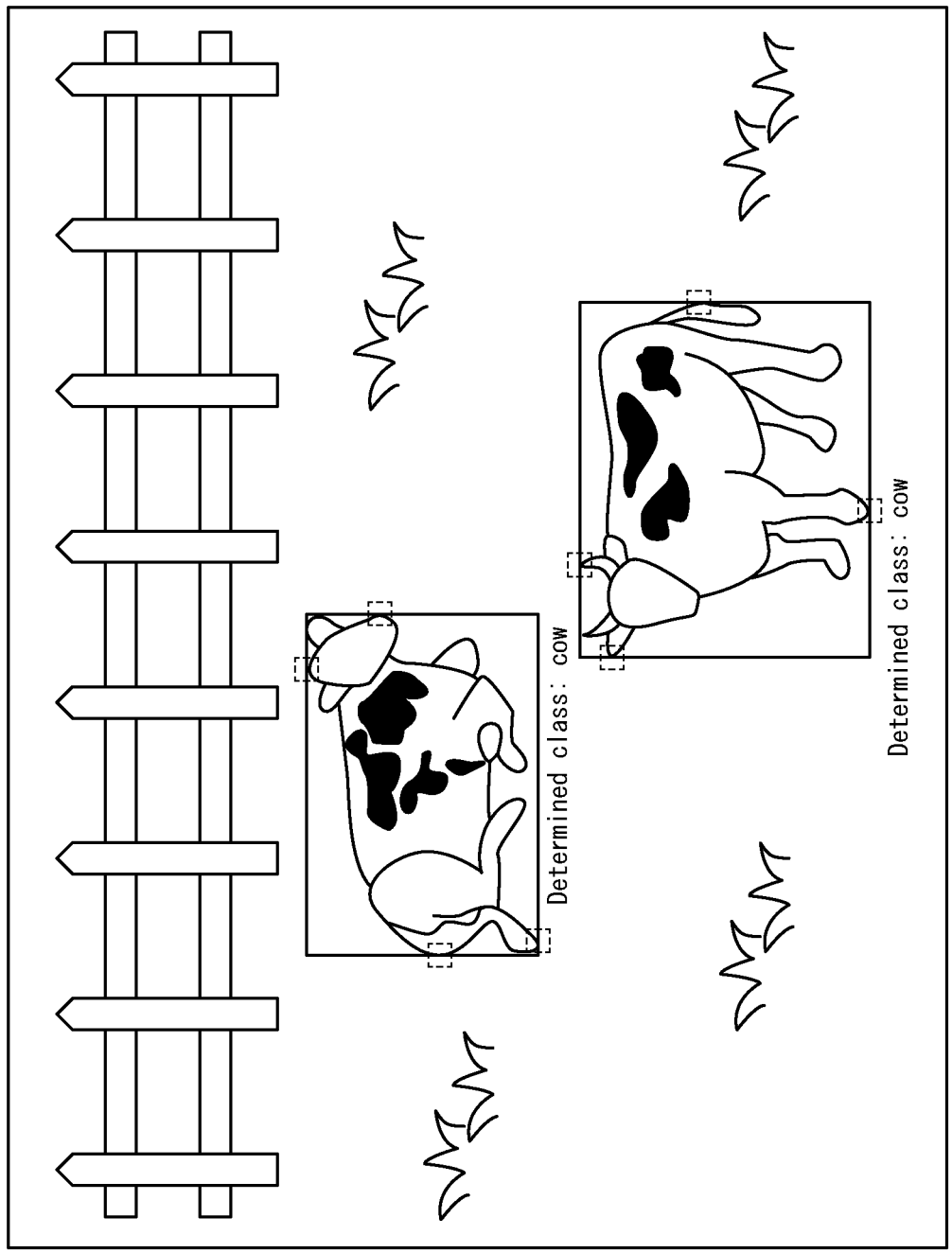

OBJECT DETECTION METHOD AND OBJECT DETECTION DEVICE

BACKGROUND

Technical Field

The present disclosure relates to object detection methods and object detection devices that detect a defined object from an image.

Description of Related Art

Object detection techniques that detect objects such as people and vehicles from images taken by cameras are used as a basic technology for applications such as surveillance camera systems and vehicle camera systems. In recent years, deep learning has been used in object detection techniques. Examples of object detections methods according to deep learning include ExtremeNet (see Non-Patent Literature 1) and YOLO (see Non-Patent Literature 2).

According to Non-Patent Literature 1, four extreme points related to a boundary of an object in an image (minimum value on X axis, maximum value on X axis, minimum value on Y axis, and maximum value on Y axis) are detected by using a trained neural network. Then, by determining a rectangular area referred to as a bounding box (BB) surrounding the object using these four extreme points, accuracy of detecting a position of the object is improved.

According to Non-Patent Literature 2, high speed object detection is realized by performing both "detection" and "identification" at the same time by evaluating an entire image only once, where "detection" specifies position of an area containing an object in an image and "identification" specifies whether a detected object corresponds to an object class to be detected, these being performed separately in a conventional neural network.

CITATION LIST

[Non-Patent Literature 1] Xingyi Zhou, Jiacheng Zhuo, Philipp Krahenbuhl, "Bottom-up Object Detection by Grouping Extreme and Center Points", Computer Vision and Pattern Recognition (CVPR) 2019

[Non-Patent Literature 2] Joseph Redmon, Santosh Divvala, Ross Girshick, Ali Farhadi, "You Only Look Once: Unified, Real-Time Object Detection", Computer Vision and Pattern Recognition (CVPR) 2016

However, Non-Patent Literature 1 calculates a likelihood indicating a probability of being an extreme point for each pixel at the resolution of the image inputted, and it takes time to calculated this likelihood for each pixel.

According to Non-Patent Literature 2, positions of feature points such as object extreme points are not calculated, and therefore although fast, it may not be possible to detect the position of an object with sufficient accuracy.

SUMMARY

One or more embodiments of the present disclosure provide an object detection method and an object detection device capable of fast and accurate object detection.

One aspect of the present disclosure is a detection method detecting a defined object from an image, including extreme point estimation estimating an extreme point area including a (boundary) feature point that satisfies a criterion related to a boundary of the object on the image.

The detection method may further include: area estimation estimating an object area including the object; and association associating the object area with the extreme point area, thereby associating the feature point included in the extreme point area with an object feature point in the object area.

The detection method may further include determination determining an object class to which the object included in the object area corresponds.

The detection method may further include correction correcting position and size of the object area according to (depending on) the associated extreme point area.

The detection method may further include removal, when a plurality of object areas are estimated in the area estimation, removing a number (part) of the object areas based on a degree of overlap between the object areas.

The detection method may be configured such that the feature point is a point (disposed) on a boundary of the object on the image that has a maximum value or a minimum value on a coordinate axis of a two-dimensional Cartesian coordinate system.

The detection method may be configured such that when (provided that) two two-dimensional coordinate systems having different coordinate axis angles are assumed on an image plane, one is a first coordinate system and the other is a second coordinate system, and the feature points are a set of points on a boundary of the object on the image, including a point having a maximum value or a minimum value on a coordinate axis of the first coordinate system and a point having a maximum value or a minimum value on a coordinate axis of the second coordinate system.

The detection method may be configured such that the area estimation and the extreme point estimation are executed in parallel by a trained model that has undergone machine learning to detect the object.

The detection method may be configured such that the area estimation, the extreme point estimation, and the determination are executed in parallel by a trained model that has undergone machine learning to detect the object.

The detection method may be configured such that the trained model is a convolutional neural network, and parameters of the convolutional neural network are determined by machine learning based on a training image including an object to be detected, a true value of a position of the object to be detected in the training image, and a true value of a position of a feature point that satisfies a criterion regarding a boundary of the object to be detected in the training image.

Another aspect of the present disclosure is an object detection device detecting a defined object from an image, including a trained model that has undergone machine learning to detect the object by executing extreme point estimation processing that estimates an extreme point area including a (boundary) feature point that satisfies a criterion related to a boundary of the object on the image.

According to the aspects of the present disclosure, feature points related to an object boundary are estimated as an area, and therefore it is not necessary to execute high processing cost calculations such as likelihood for each pixel, and the feature points (extreme points) related to the object boundary can be detected at high speed. Further, the area including the extreme points of the object is estimated instead of an area including an entirety of the object, and therefore the boundary of the object can be detected with high accuracy.

BRIEF DESCRIPTION OF DRAWINGS

FIG. 4 is a diagram illustrating data structure of object estimation data output by the trained AI module 20.

FIG. 8 is a diagram illustrating example remaining object BB and extreme point BB after removing object BB and extreme point BB of grid cells determined to be background and removing object BB and extreme point BB having a high degree of overlap with a grid cell having a higher confidence score.

FIG. 9A illustrates an example of object BB and extreme point BB remaining after processing by overlapping BB remover 30. FIG. 9B illustrates an example of a first extreme point BB, a second extreme point BB, a third extreme point BB, and a fourth extreme point BB associated with an object BB.

FIG. 11 is a diagram illustrating an example object detection result in which object BB position and size, associated four extreme point BB, and associated grid cell determination results are superimposed and displayed on an input image.

DETAILED DESCRIPTION OF EMBODIMENTS

1. Embodiment 1

The following described an object detection device 1 according to Embodiment 1.

1.1. Structure

Figure 1:
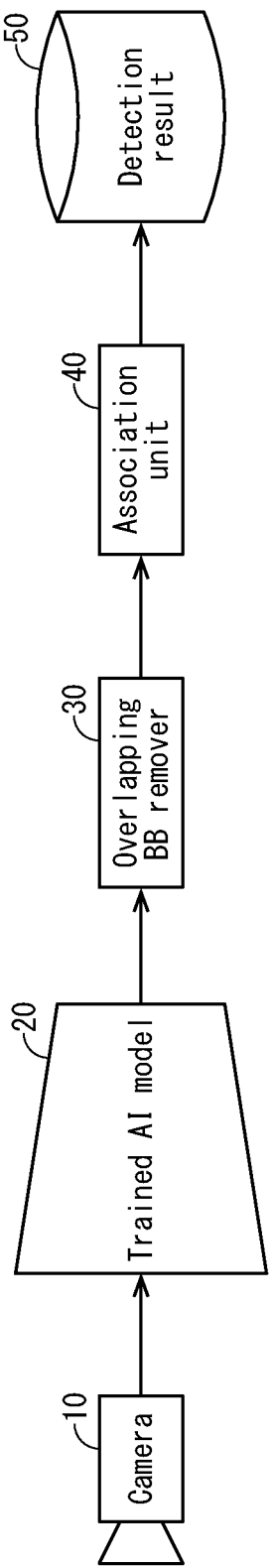
FIG. 1 is a block diagram illustrating a schematic structure of object detection device 1 according to Embodiment 1.

FIG. 1 is a block diagram illustrating structure of the object detection device 1. As illustrated, the object detection device 1 includes a camera 10, a trained artificial intelligence (AI) model 20, an overlapping BB remover 30, an association unit 40, and an object detection result storage 50.

The camera 10 is equipped with an image sensor such as a complementary metal-oxide semiconductor field-effect transistor (CMOS) image sensor or charge-coupled device (CCD) image sensor, and outputs an image of defined size by converting light imaged on the image sensor into electrical signals by photoelectric conversion. If size of an output image of the camera 10 and size of an input image of the trained AI module 20 are different, the output image of the camera 10 may be resized.

The trained AI module 20 is a convolutional neural network that has undergone machine learning to detect a defined object using a teacher signal, and outputs object estimation data by evaluating an entire image once from an input image of defined size. The object estimation data includes data such as a BB (object (area) BB) that surrounds an object to be detected on an input image, a BB (extreme point (area) BB) that includes a (boundary) feature point (extreme point) that satisfies a criterion related to a boundary of the object to be detected on the input image, and a class probability indicating which object class to be detected corresponds to the object surrounded by the object BB. Details of the teacher signal used in training and the object estimation data output are described later.

The overlapping BB remover 30 removes object BB having a confidence score lower than a threshold value and object BB having a high degree of overlap with object BB having a higher confidence score from the object estimation data output by the trained AI model 20. Similarly, the overlapping BB remover removes extreme point BB having a confidence score lower than a threshold value and extreme point BB having a high degree of overlap with extreme point BB having a higher confidence score. A confidence score is calculated using confidence and class probability of object BB and extreme point BB included in the object estimation data.

The association unit 40 associates object BB and extreme point BB that remain, and shapes object BB according to associated extreme point BB, that is, corrects position and size of object BB.

The object detection results storage 50 stores, as detection results, position and size of object BB after shaping, and a class determination value based on class probability of the object BB.

Each processing unit of the trained AI model 20, the overlapping BB remover 30, and the association unit 40 is a computer system comprising a microprocessor, read-only memory (ROM), random access memory (RAM), hard disk drive (HDD), and the like. A computer program loaded from the ROM or HDD is stored in the RAM, and the microprocessor realizes functions of the processing unit by operating according to the computer program on the RAM. Here, a computer program is configured by combining instructions codes indicating commands to a computer in order to achieve a defined function. The object detection result storage 50 is realized by a storage such as an HDD.

1.2. Trained AI Model 20

According to the present embodiment, the trained AI model 20 is a convolutional neural network that has undergone machine learning to detect an object such as a person, a dog, or a cow as an object class to be detected. The trained AI model 20 outputs object estimation data for each width (W)×height (H) grid cell into which an input image is divided.

Figure 2:
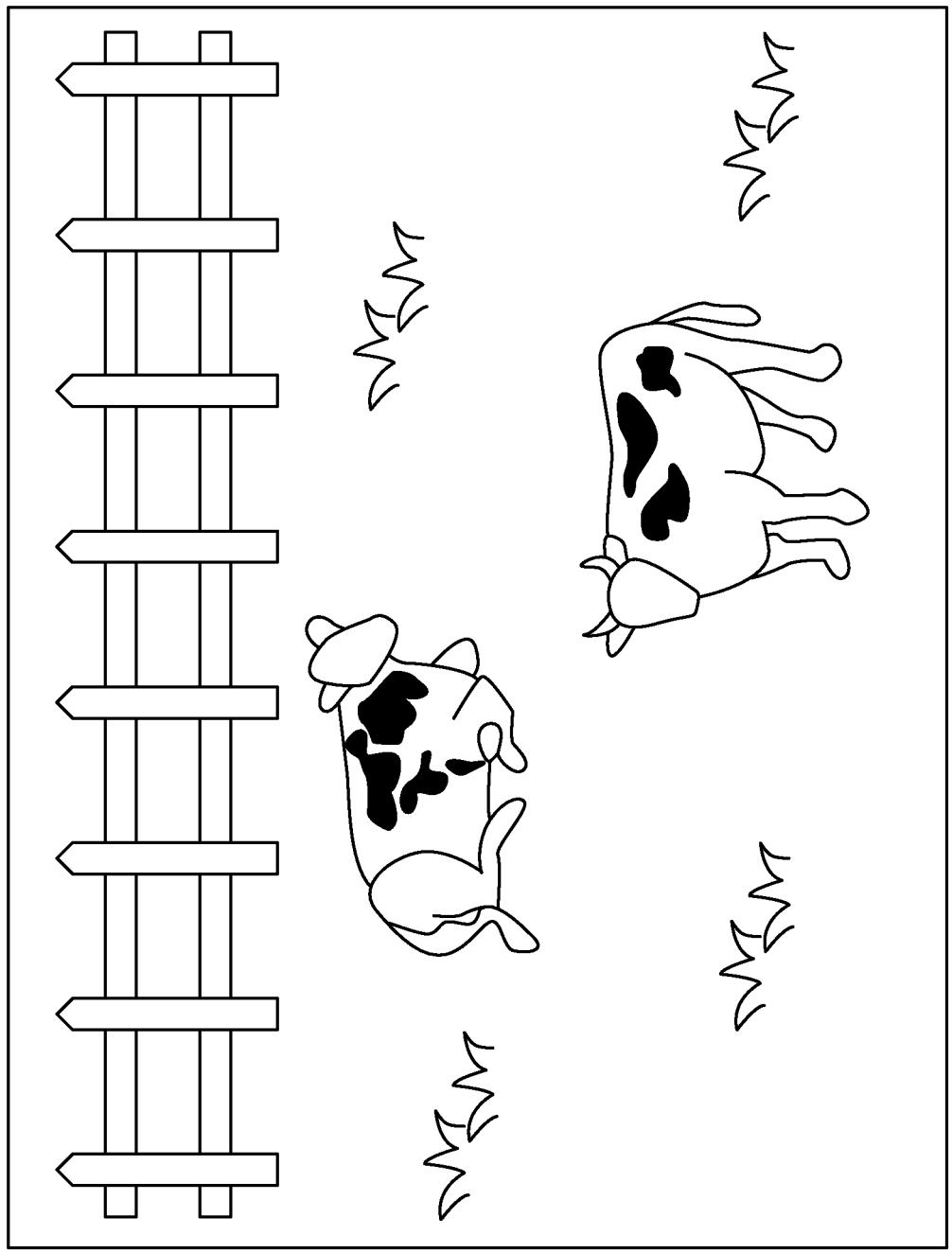
FIG. 2 is a diagram illustrating an example photograph image taken by camera 10, which becomes input for trained artificial intelligence (AI) module 20.
Figure 3:
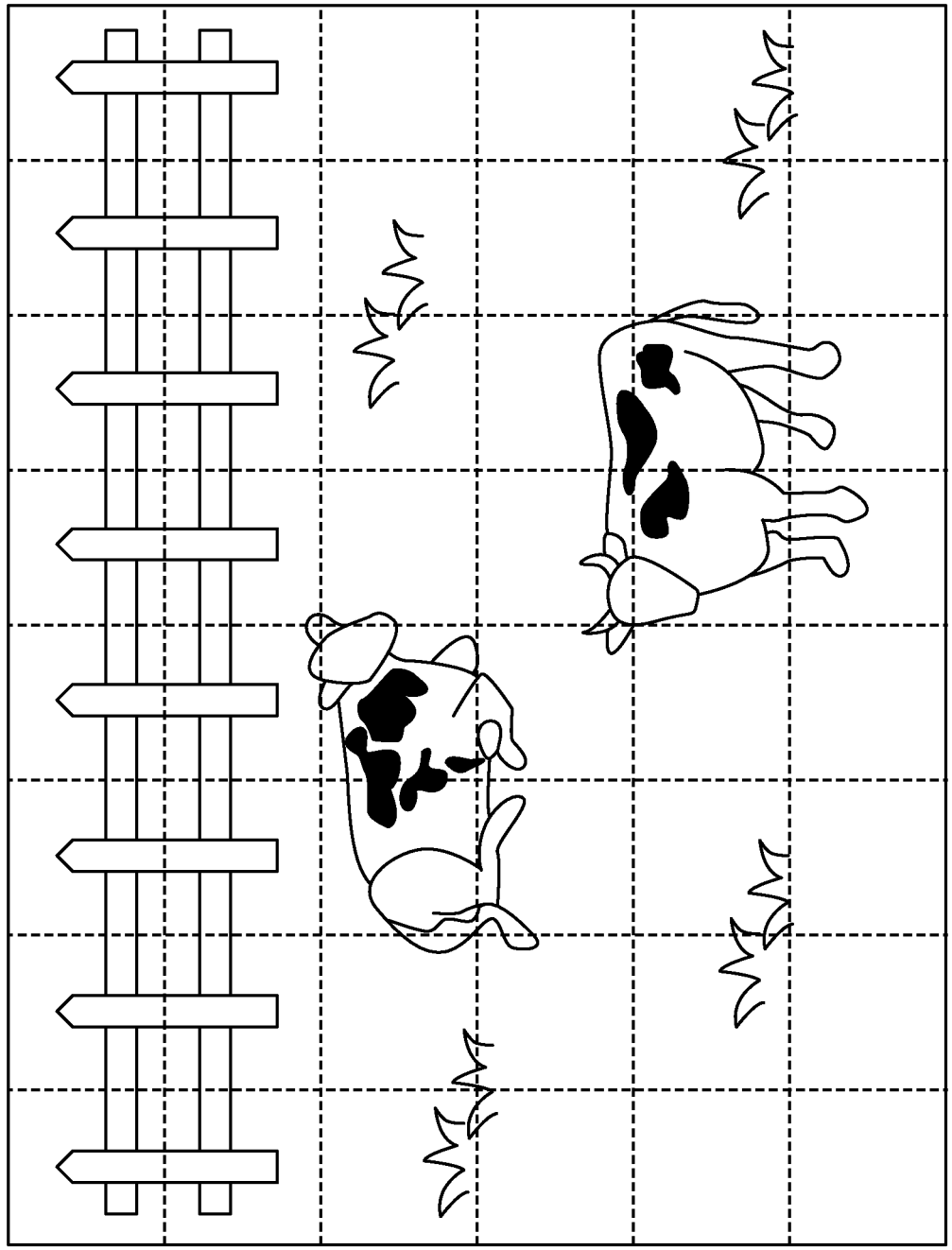
FIG. 3 is a diagram illustrating a photograph image divided into width (W)×height (H) grid cells.

FIG. 2 illustrates an example input image of the trained AI model 20 and FIG. 3 illustrates the input image divided into grid cells. In the example of FIG. 3, the input image is divided into an 8×6 grid of grid cells.

FIG. 4 illustrates a data structure of object estimation data 400 for each grid cell. As illustrated in FIG. 4, the object estimation data 400 includes object BB information, first extreme point BB information, second extreme point BB information, third extreme point BB information, fourth extreme point BB information, and class probability.

The object BB information consists of position (on X axis and Y axis) relative to the grid cells, size (X axis and Y axis), and confidence. Position relative to the grid cells is information indicating estimated position of an object BB, and indicates an upper left coordinate of the object BB when an upper left coordinate of the corresponding grid cell is taken as the origin. Size is information indicating size of an object BB, and indicates a lower right coordinate of the object BB when the upper left coordinate of the object BB is the origin. Confidence is information indicating whether an object corresponding to any of the object classes to be detected exists in the object BB, and if it does, whether position and size is accurately detected. Confidence is close to 1 when it is estimated that an object corresponding to an object class to be detected exists in the object BB, and close to 0 when it is estimated that an object does not exist in the object BB. Further, confidence is close to 1 when it is estimated that position and size are detected accurately, and close to 0 when it is estimated that position and size are not detected accurately.

Similarly, the first extreme point BB information, the second extreme point BB information, the third extreme point BB information, and the fourth extreme point BB information also consist of position (X axis and Y axis) relative to the grid cells, size (X axis and Y axis), and confidence. Here, according to the present embodiment, among points on a boundary between an object and a background on an image, a point having a minimum value on the X axis is referred to as a first extreme point. Similarly, among points on the boundary between the object and the background, a point having a maximum value on the X axis is referred to as a second extreme point, a point having a minimum value on the Y axis is referred to as a third extreme point, and a point having a maximum value on the Y axis is referred to as a fourth extreme point. The first extreme point BB is a BB including the first extreme point of an object detected in an object BB of a same grid cell. Similarly, the second extreme point BB, the third extreme point BB, and the fourth extreme point BB are BBs that include the second extreme point, the third extreme point, and the fourth extreme point, respectively, of the object detected in the object BB of the same grid cell. Each of the extreme point BB are smaller than the size of the object BB and are estimated as BB having a size depending on size of the object BB.

Class probability is information indicating an estimated value of which of the object classes to be detected corresponds to the object included in the object BB of the corresponding grid cell. For example, if the number of object classes is C and the object classes include class 1 (person), class 2 (dog), class 3 (cow), and the like, then if it is estimated that an object BB includes a person, the probability of a person (class 1) is high (takes a value close to 1), and if it is estimated that the object BB includes a cow, the probability of a cow (class 3) is high (takes a value close to 1).

In this way, the trained AI model 20 outputs five values for each BB information (object BB information, first extreme point BB information, second extreme point BB information, third extreme point BB information, and fourth extreme point BB information) and C values of class probability information for (5×5+C) values of object estimation data for each grid cell. This is calculated for each of W×H grid cells, and therefore the object estimation data output by the trained AI model 20 is W×H×(25+C) data values (third order tensor).

Figure 5:
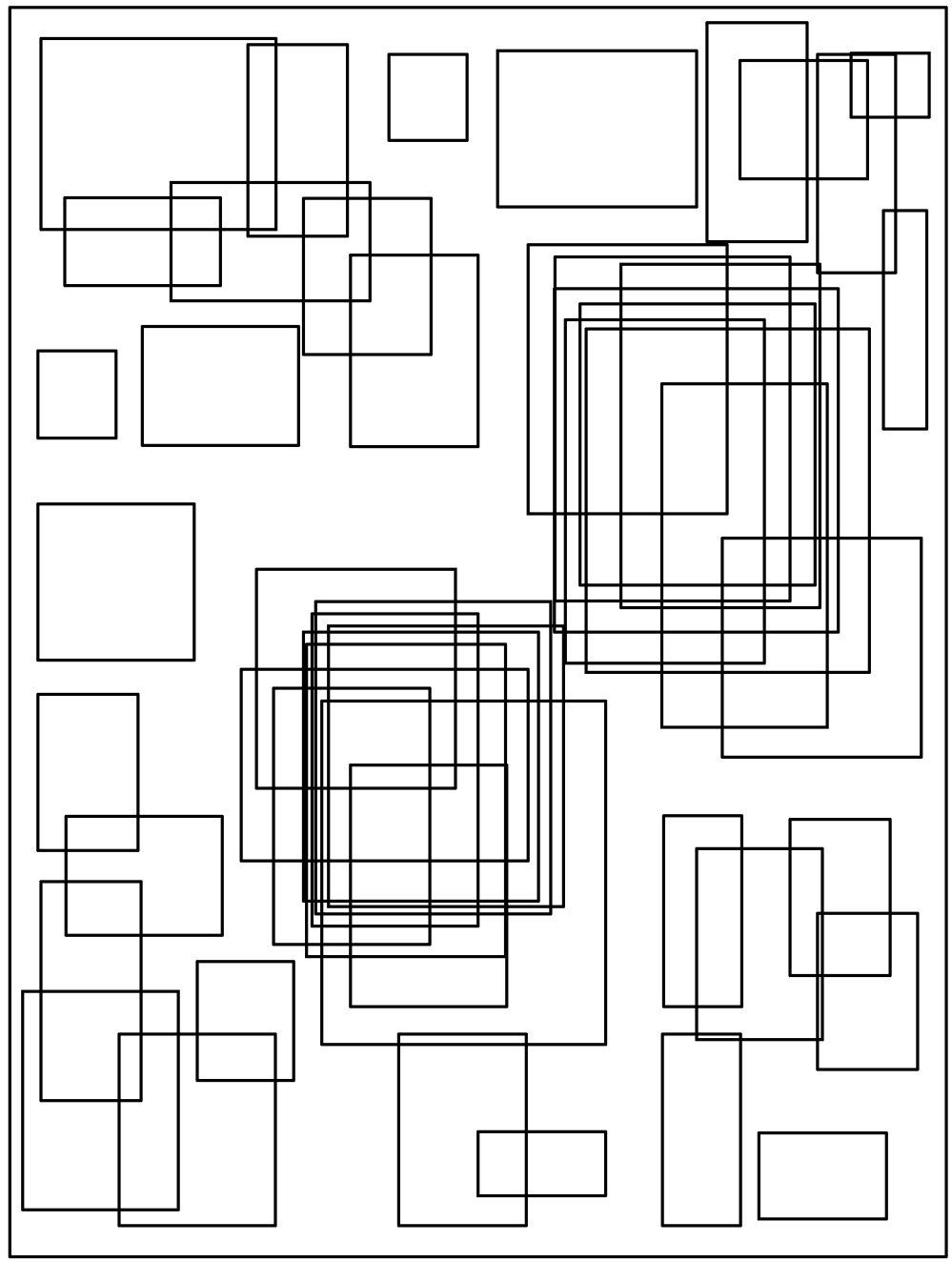
FIG. 5 is a diagram illustrating position and size of object bounding boxes (BB) in object estimation data.

FIG. 5 is an example diagram illustrating position of object BB of each grid cell in object estimation data output from an input image. As illustrated, W×H (8×6 in this example) object BB are output. Similarly, for each extreme point BB, W×H are output.

1.4. Overlapping BB Remover 30

The following describes processing by the overlapping BB remover 30.

Figure 6:
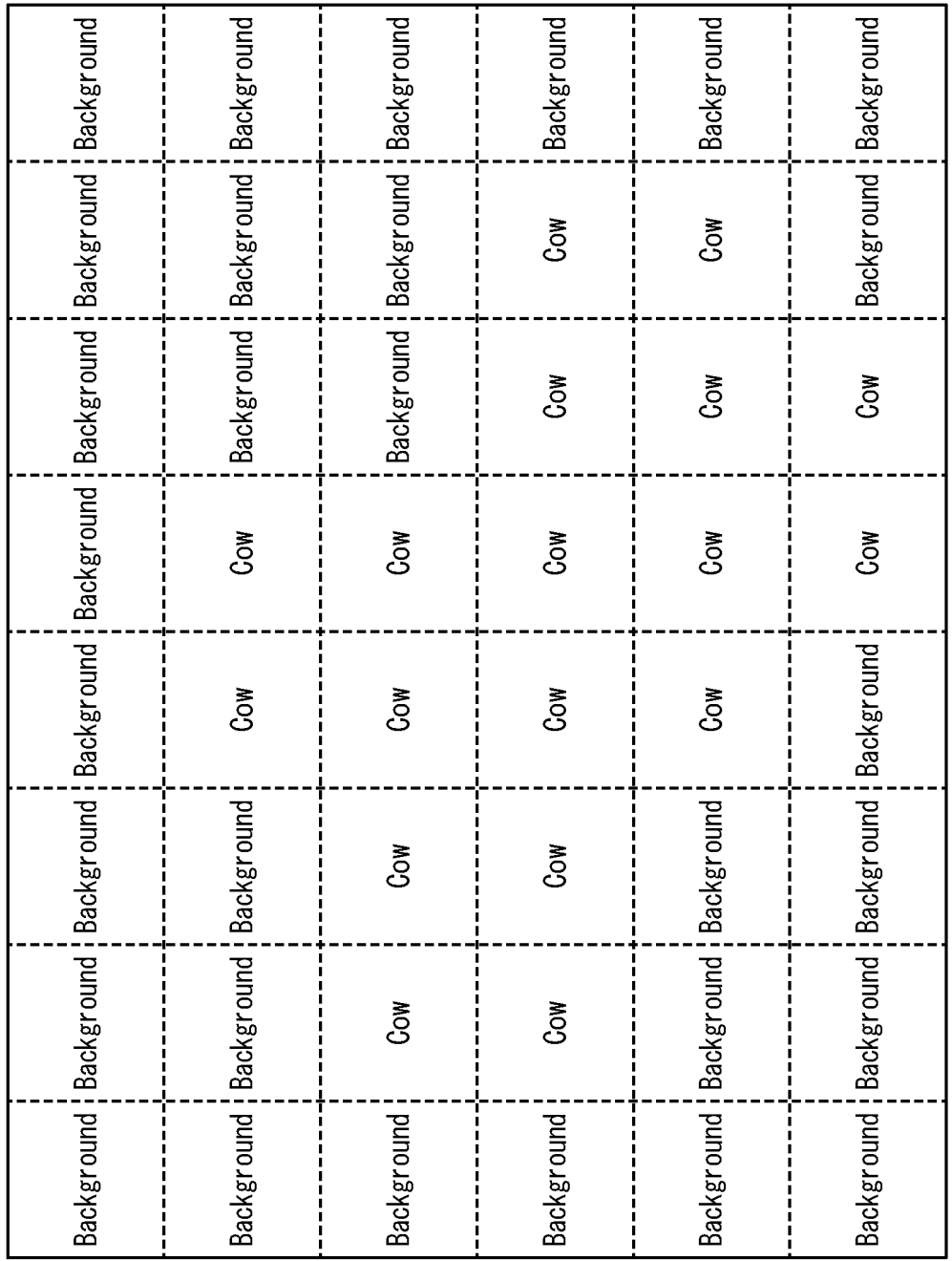
FIG. 6 is a diagram illustrating an example of classification results of classification performed for each grid cell.

The overlapping BB remover 30 classifies each grid cell based on object estimation data output by the trained AI model 20. The overlapping BB remover 30 calculates a confidence score for each grid cell, and determines that a grid cell having a confidence score less than or equal to a defined threshold value (for example, 0.6) is a background grid cell that does not include an object. The overlapping BB remover 30 determines that grid cells other than background grid cells are grid cells of an object class having a highest class probability. FIG. 6 illustrates an example of classification results of classification performed for each grid cell.

The confidence score is, for example, the product of a probability of an object class having a highest probability and a confidence of the object BB. Note that confidence of an object BB may be used as is for the confidence score, or class probability of an object class having a highest probability may be used as the confidence score.

The overlapping BB remover 30 removes object BB and each extreme point BB of grid cells determined to be background.

The overlapping BB remover 30, for grid cells determined to be an object class other than background, for each type of determined object class, removes an object BB having a high degree of overlap with an object BB of a grid cell having a higher confidence score. More specifically, for one object class, a degree of overlap between an object BB of a grid cell having a highest confidence score and an object BB of another grid cell is calculated, and an object BB having a calculated degree of overlap equal to or greater than a defined threshold value (for example, 0.6) is removed. Subsequently, a degree of overlap between the object BB of the grid cell having the highest confidence score among the object BB that were not removed and an object BB of another grid cell is calculated, and if a degree of overlap is high, the process of removing is repeated.

In this way, by removing an object BB that has a high degree of overlap with an object BB that has a higher confidence score, then even if multiple object BB are detected for the same object, one object can be detected.

Figure 7:
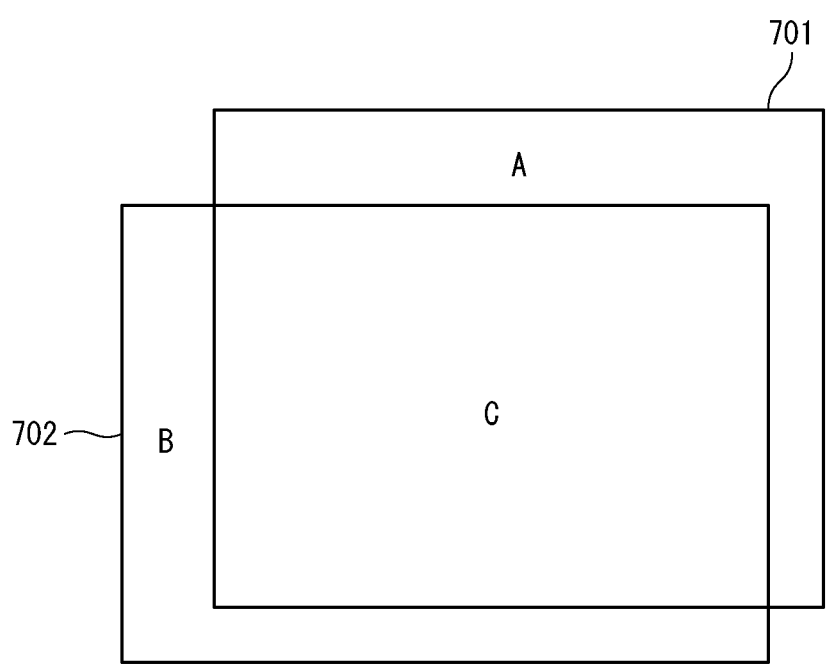
FIG. 7 is a diagram illustrating intersection over union (IoU), which is an index of a degree of overlap between two areas.

As a degree of overlap, intersection-over-union (IoU) can be used, for example. In IoU, when an area 701 and an area 702 overlap as illustrated in FIG. 7, and when an area of a portion of the area 701 that does not overlap with the area 702 is A, an area of a portion of the area 702 that does not overlap with the area 701 is B, and an area where the area 701 and the area 702 overlap is C, IoU can be calculated as C/(A+B+C).

The object BB remover 30 also, similarly to the object BB, removes a first extreme point BB having a high degree of overlap with a first extreme point BB of a grid cell having a higher confidence score for the first extreme point BB. The same applies for the second extreme point BB, the third extreme point BB, and the fourth extreme point BB.

FIG. 8 is a diagram illustrating example remaining object BB and end point BB after removing object BB and end point BB of grid cells determined to be background and removing object BB and end point BB having a high degree of overlap with a grid cell having a higher confidence score. In the example of FIG. 8, for grid cells having an object class "cow", there are two object BB, five first extreme point BB, four second extreme point BB, three third extreme point BB, and four extreme point BB that remain without being removed.

1.5. Association Unit 40

The following describes processing by the association unit 40.

The association unit 40 associates remaining object BB with extreme point BB after the processing of the overlapping BB remover 30. More specifically, the association unit 40 identifies, for one object BB out of remaining object BB, a first extreme point BB at a position closest to a first side of the object BB, and associates the identified first extreme point BB with the object BB. Similarly, a second extreme point BB, a third extreme point BB, and a fourth extreme point BB located closest to second, third, and fourth sides of the object BB are identified, and the identified second extreme point BB, third extreme point BB, and fourth extreme point BB are associated with the object BB.

Regarding the four sides of an object BB, of two sides parallel to the Y axis, the one with a smaller X axis value is the first side, and the one with a larger X axis value is the second side, while of two sides parallel to the X axis, the one with a smaller Y axis value is the third side and the one with the larger Y axis value is the fourth side.

Further, a distance between a side and a BB is a distance from a center of the BB to a nearest point of the side.

FIG. 9A illustrates an example of an object BB and extreme point BB remaining after processing by the overlapping BB remover 30, and FIG. 9B illustrates an example of a first extreme point BB, a second extreme point BB, a third extreme point BB, and a fourth extreme point BB associated with the object BB.

The association unit 40, after processing by the overlapping BB remover 30, for each remaining object BB, associates a first extreme point BB, a second extreme point BB, a third extreme point BB, and a fourth extreme point BB with the object BB.

Figure 10B:
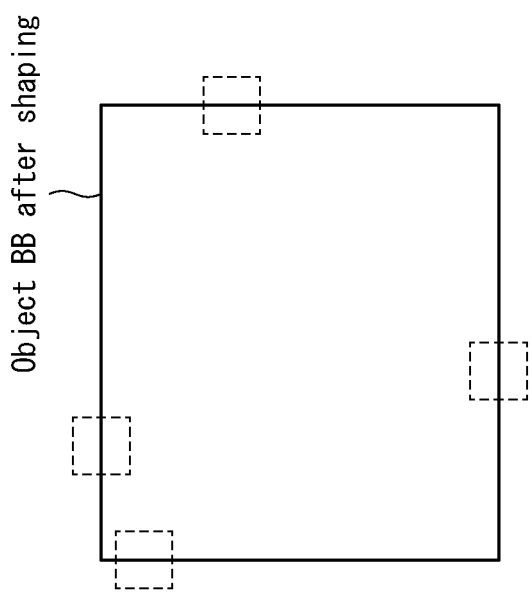
FIG. 10B is a diagram illustrating object BB after shaping.
Figure 10A:
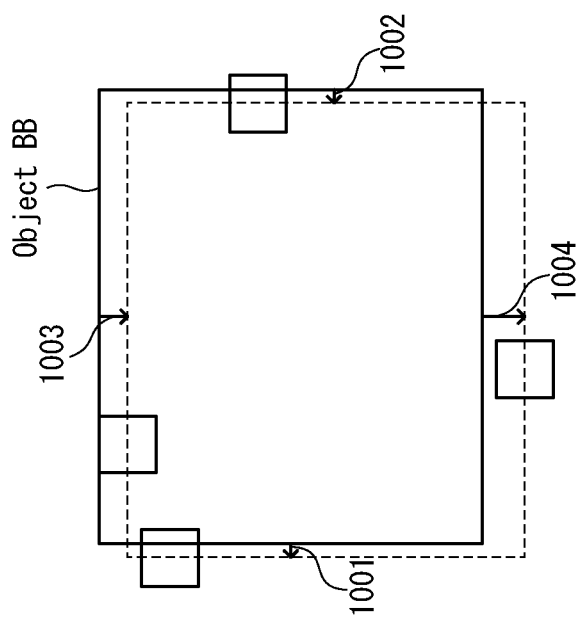
FIG. 10A is a diagram illustrating association between object BB and extreme point BB.

The association unit 40 shapes the object BB associated with four extreme point BB based on the four extreme point BB. More specifically, the association unit 40, as illustrated by reference sign 1001 in FIG. 10A, moves the first side so that an X coordinate of the first side coincides with an X coordinate of the center of the first extreme point BB. Similarly, as indicated by the reference signs 1002, 1003, 1004, the second side is moved so that an X coordinate of the second side coincides with an X coordinate of the center of the second extreme point BB, the third side is moved so that a Y coordinate of the third side coincides with a Y coordinate of the center of the third extreme point BB, and the fourth side is moved so that a Y coordinate of the fourth side coincides with a Y coordinate of the center of the fourth extreme point BB. FIG. 10B is a diagram illustrating object BB after shaping.

After processing by the overlapping BB remover 30, the association unit 40 shapes all remaining object BB based on associated four extreme point BB.

The association unit 40 stores position and size of object BB after shaping, positions of associated extreme point BB, and classification results of corresponding grid cells as object detection results in the object detection result storage 50.

FIG. 11 is a diagram illustrating an example object detection result in which object BB position and size, corresponding four end point BB, and corresponding classification results are superimposed and displayed on an input image.

1.6. Operations

Figure 12:
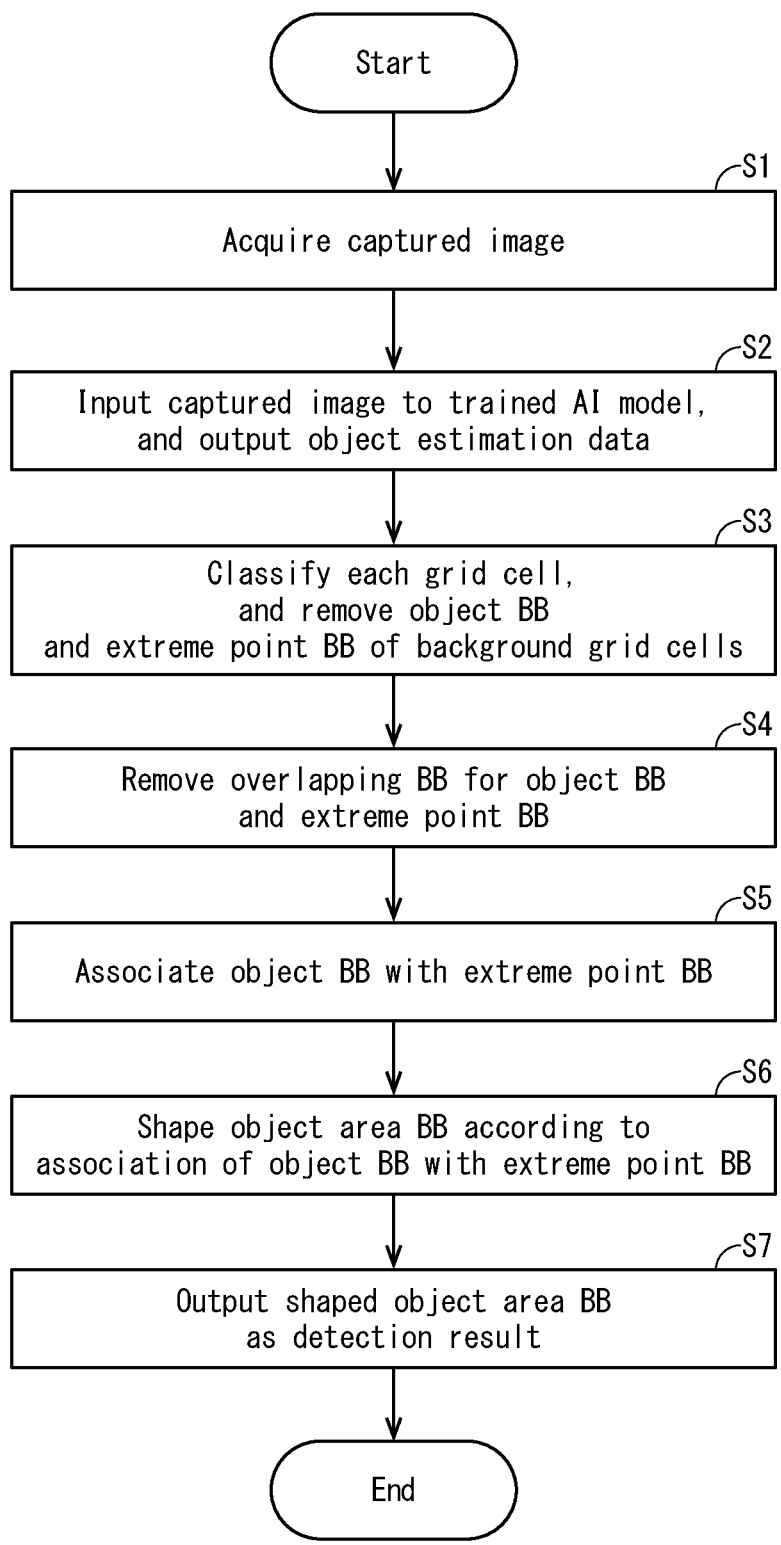
FIG. 12 is a flowchart illustrating operation of object detection device 1.

FIG. 12 is a flowchart illustrating operation of the object detection device 1.

The camera 10 acquires a captured image (step S1), inputs the captured image to the trained AI model 20, and the trained AI model 20 outputs W×H×(25+8) values of object estimation data (step S2).

The overlapping BB remover 30 classifies grid cells, removes object BB and extreme point BB of background grid cells (step S3), and also removes BB (object BB and extreme point BB) having a high degree of overlap with BB (object BB and extreme point BB) of grid cells having a higher confidence score (step S4).

The association unit 40 associates remaining object BB with extreme point BB (step S5), shapes the object BB based on positions of associated extreme point BB (step S6), and outputs the object BB after shaping and associated extreme point BB as an object detection result (step S7).

1.7. Training Method of Trained AI Model 20

The trained AI model 20 is a convolutional neural network consisting of 24 convolutional layers, four pooling layers, and two fully connected layers, similar to You Only Look Once (YOLO) as described in Non-Patent Literature 2. According to YOLO, an input image is divided into S×S grid cells, and B BB are output for each grid cell, but in contrast, according to the trained AI model 20, an input image is divided into W×H grid cells, and 5 BB (object BB, first extreme point BB, second extreme point BB, third extreme point BB, and fourth extreme point BB) are output for each grid cell.

When training, a training image including an object to be detected, and a teacher signal are input, where the teacher signal is true values of position and size of object BB of the object to be detected in the training image along with position and size of four extreme point BB, and object class (one-hot class probability) of the object included in the object BB. Here, position of an extreme point BB of a teacher signal may have a center that coincides with true value of an extreme point of the object to be detected and size may be a constant multiple of an area of the object BB. Area of the object BB may be approximated by length of a diagonal line bisecting the object BB.

Then training is advanced so that five errors are reduced for object estimation data for each grid cell detected by performing object detection on the input image (parameters of the convolutional neural network are determined). The five errors are (1) error between detected position of the object BB and each extreme point BB of a grid cell where a center of the object BB of the teacher signal exists and position of a center of the object BB and each extreme point BB of the teacher signal; (2) error between detected size of the object BB and each extreme point BB of a grid cell where a center of the object BB of the teacher signal exists and size of the object BB and each extreme point BB of the teacher signal; (3) error between confidence of the object BB and each extreme point BB of a grid cell where a center of the object BB of the teacher signal exists and confidence of the object BB and each extreme point BB of the teacher signal; (4) error between confidence of the object BB and each extreme point BB of a grid cell where a center of the object BB of the teacher signal does not exist and non-object confidence; and (5) error between class probability of a grid cell where a center of the object BB of the teacher signal exists and object class. Confidence of the object BB and each extreme point BB of the teacher signal may be calculated as 1, and non-object confidence may be calculated as 0.

2. Supplement

Although one or more embodiments of the present invention are described above, the present invention is of course not limited to the embodiments described above, and the following modifications are of course included in the technical scope of the present invention.

(1) According to the embodiments described above, extreme points are detected from points on boundaries between an object and background such that the first extreme point has a minimum value on the X axis, the second extreme point has a maximum value on the X axis, the third extreme point has a minimum value on the Y axis, and the fourth extreme point has a maximum value on the Y axis, but detected extreme points are not limited to these four extreme points. For example, when a plurality of two-dimensional coordinate systems having different coordinates axis angles are assumed in an image plane, the above four extreme points in each coordinate system may be detected. For example, it is possible to detect an object as an octagonal area by detecting a total of eight extreme points from two two-dimensional coordinate systems that differ by 45 degrees.

(2) In the embodiments described above, each processing unit of the trained AI model 20, the overlapping BB remover 30, and the association unit 40 is computer system composed of a microprocessor, ROM, RAM, HDD, and the like, but a part or all of each processing unit may be a system large scale integration (LSI).

(3) The above embodiments and modification may be combined.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

INDUSTRIAL APPLICABILITY

The above embodiments of the present disclosure are useful as an object detection device mounted on a surveillance camera system or vehicular camera system.

REFERENCE SIGNS

1 Object detection device
10 Camera
20 Trained AI model
30 Overlapping BB remover
40 Association unit
50 Object detection result storage

The invention claimed is:

1. A detection method of detecting a defined object from an image, comprising:
dividing the image into grid cells;
estimating, for each of the grid cells, one or more object areas each having a rectangular shape on the image including the object that has an object feature point;
estimating, for each of the grid cells, extreme point areas on the image including boundary feature points that satisfy a criterion of a boundary of the object;
identifying, from among the estimated extreme point areas, closest extreme point areas to respective sides of each of the object areas;
associating each of the boundary feature points with the object feature point by associating the identified extreme point areas with each of the object areas; and
correcting a position and a size of each of the object areas depending on the associated extreme point areas.

2. The detection method of claim 1, further comprising:
determining an object class to which the object corresponds.

3. The detection method of claim 1, further comprising:
upon estimating the object areas, removing a part of the object areas based on a degree of overlap between the object areas.

4. The detection method of claim 1, wherein
each of the boundary feature points:
is disposed on the boundary of the object, and
has a maximum value or a minimum value on a coordinate axis of a two-dimensional Cartesian coordinate system.

5. The detection method of claim 1, wherein
provided that first and second two-dimensional coordinate systems having different coordinate axis angles are on an image plane,
the extreme point areas include, as the boundary feature points, a set of first and second points on the boundary of the object, wherein the first point has a maximum value or a minimum value on a coordinate axis of the first two-dimensional coordinate system, and the second point has a maximum value or a minimum value on a coordinate axis of the second two-dimensional coordinate system.

6. The detection method of claim 1, wherein
the estimating of the object areas and the estimating of the extreme point areas are executed in parallel by a trained model that has undergone machine learning to detect the object.

7. The detection method of claim 2, wherein
the estimating of the object areas, the estimating of the extreme point areas, and the determining of the object class are executed in parallel by a trained model that has undergone machine learning to detect the object.

8. The detection method of claim 6, wherein
the trained model is a convolutional neural network, and
the machine learning determines parameters of the convolutional neural network based on:
a training image including the object;
a true value of a position of the object in the training image; and
a true value of a position of each of the boundary feature points in the training image.

9. An object detection device that detects a defined object from an image, the object detection device comprising:
a hardware processor that:
divides the image into grid cells,
estimates, for each of the grid cells using a trained neural network that has undergone machine learning, one or more object areas each having a rectangular shape on the image including the object that has an object feature point,
estimates, for each of the grid cells using the trained neural network, extreme point areas on the image including boundary feature points that satisfy a criterion of a boundary of the object,
identifies, from among the estimated extreme point areas, closest extreme point areas to respective sides of each of the object areas,
associates the boundary feature points with the object feature point by associating the identified extreme point areas with each of the object areas, and
corrects a position and a size of each of the object areas depending on the associated extreme point areas.

10. The detection method of claim 1, wherein
the extreme point areas include a bounding box that surrounds the boundary of the object.

11. The detection method of claim 1, wherein
each of the object areas is a bounding box that surrounds the object.

12. A non-transitory computer-readable storage medium storing an object detection program that causes a computer to execute the detection method of claim 1.

13. The detection method of claim 1, wherein
the position and the size of each of the object areas is corrected by moving each of the sides such that a coordinate of each of the sides matches a coordinate of a center of each of the associated extreme point areas.

14. The detection method of claim 1, wherein
the position and the size of each of the object areas is corrected such that each of the sides passes through a coordinate of a center of each of the associated extreme point areas.

* * * * *